(12) United States Patent
Wakaguri et al.

(10) Patent No.: US 10,100,389 B2
(45) Date of Patent: Oct. 16, 2018

(54) HOLLOW CONNECTOR OF ALUMINUM ALLOY EXTRUSION MATERIAL WHICH IS EXCELLENT IN EXTRUSION PROPERTY AND SACRIFICIAL ANODE PROPERTY

(71) Applicants: UACJ CORPORATION, Chiyoda-ku, Tokyo OT (JP); DENSO CORPORATION, Kariya-shi, Aichi OT (JP); DENSO AIR SYSTEMS CORPORATION, Anjo-shi, Aichi OT (JP)

(72) Inventors: Satoshi Wakaguri, Tokyo (JP); Akira Ichinose, Tokyo (JP); Toshiyuki Kakinoki, Tokyo (JP); Tatsuhito Matsumoto, Aichi-ken (JP)

(73) Assignees: UACJ Corporation, Tokyo (JP); Denso Corporation, Aichi (JP); Denso Air Systems Corporation, Aichi (JP)

( * ) Notice: Subject to any disclaimer, the term of this patent is extended or adjusted under 35 U.S.C. 154(b) by 279 days.

(21) Appl. No.: 14/854,351

(22) Filed: Sep. 15, 2015

(65) Prior Publication Data

US 2016/0002754 A1   Jan. 7, 2016

Related U.S. Application Data

(63) Continuation of application No. 12/828,681, filed on Jul. 1, 2010.

(30) Foreign Application Priority Data

Feb. 5, 2010   (JP) .................................. 2010-024616
May 19, 2010   (JP) .................................. 2010-115284

(51) Int. Cl.
   *C22C 21/10*   (2006.01)
   *C22C 21/08*   (2006.01)
   (Continued)

(52) U.S. Cl.
   CPC ............ *C22C 21/10* (2013.01); *B32B 15/016* (2013.01); *C22C 21/08* (2013.01); *F28F 21/084* (2013.01)

(58) Field of Classification Search
   CPC .................... C22C 21/08; C22C 21/10; C22C 21/00–21/18; B32B 15/016; F28F 21/084
   See application file for complete search history.

(56) References Cited

U.S. PATENT DOCUMENTS 4,231,817 A * 11/1980 Takeuchi ................ C22C 21/10
                                                              148/439
4,991,647 A *  2/1991 Kawabe ................ B32B 15/016
                                                              165/134.1

FOREIGN PATENT DOCUMENTS

JP   H10-130765 A    5/1998
JP   H11-310841 A   11/1999
(Continued)

OTHER PUBLICATIONS

ASM International, "Abbreviations and Symbols", 2007, "http://products.asminternational.org/hbk/do/highlight/content/V13B/D50/A10/index.htm".
(Continued)

*Primary Examiner* — George Wyszomierski
*Assistant Examiner* — Janell C Morillo
(74) *Attorney, Agent, or Firm* — Carrier Blackman & Associates, P.C.; Joseph P. Carrier; William D. Blackman

(57) ABSTRACT

An aluminum alloy connector which is excellent in extrusion property and sacrificial anode property, the connector being extruded in a hollow shape from an aluminum alloy extrusion material consisting of 0.2 to 0.8% (hereinafter, "%" means "mass %") of Si, 0.45 to 0.9% of Mg, 1.0 to 3.5% of Zn, 0.001 to 0.2% of Ti and the balance of Al plus unavoidable impurities. An electric potential of said aluminum alloy extrusion connector is lower than an electric (Continued)

potential of a pipe member made of an Al—Mg—Si series alloy or an Al—Mn series alloy which is to be swaged to the connector, by 100 mV or more.

10 Claims, 1 Drawing Sheet

(51) Int. Cl.
*B32B 15/01* (2006.01)
*F28F 21/08* (2006.01)

(56) References Cited

FOREIGN PATENT DOCUMENTS

JP      2002-069559 A     3/2002
JP      2007-092113 A     4/2007

OTHER PUBLICATIONS

"ASM International, "Introduction to Phase Diagrams", Alloy Phase Diagrams, vol. 3, 2012"Http://products.asminternational.org/hbk/do/highlight/content/V03/D01/A01/s0913603.htm.
Henry, "Aluminum and Aluminum Alloys", ASM International, 1993, pp. 62, 65.

\* cited by examiner

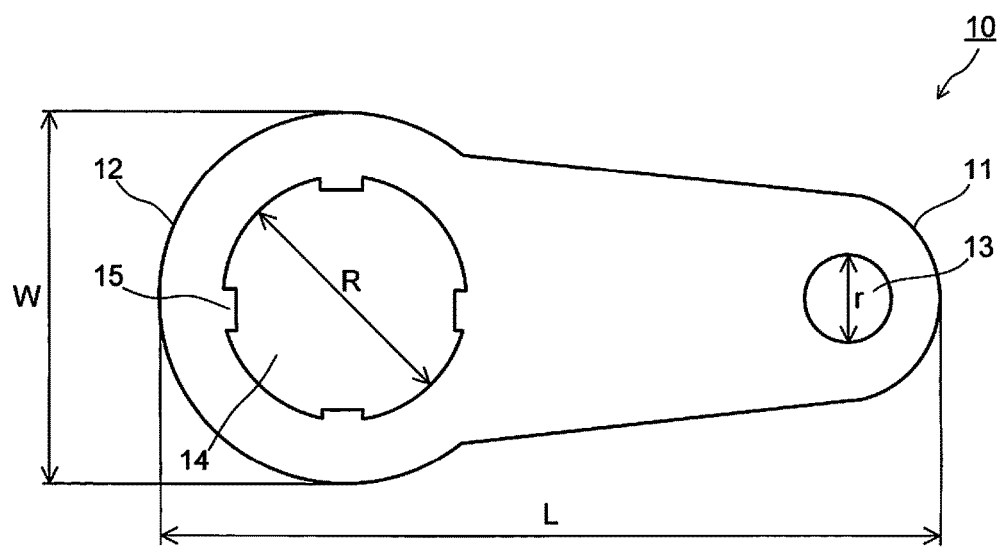

HOLLOW CONNECTOR OF ALUMINUM ALLOY EXTRUSION MATERIAL WHICH IS EXCELLENT IN EXTRUSION PROPERTY AND SACRIFICIAL ANODE PROPERTY

CROSS-REFERENCE TO RELATED APPLICATIONS

This application a continuation of application Ser. No. 12/828,681, filed Jul. 1, 2010, which is based upon and claims the benefit of priority from the prior Japanese Patent Applications No. 2010-024616 filed on Feb. 5, 2010 and No. 2010-115284 filed on May 19, 2010; the entire contents which are incorporated herein by reference.

BACKGROUND

1. Field of the Invention

The present invention relates to an aluminum alloy extrusion material for a connector which is excellent in extrusion property and sacrificial anode property and which is used for connecting pipes with a heat exchanger.

2. Background of the Invention

Conventionally, brazing process would be used for connecting pipes with connectors of a heat exchanger, for example. The brazing process has an advantage of high connection reliability, but also has disadvantage of high connection cost. In this point of view, recently, mechanical swaging process is mainly used instead of the brazing process so as to realize the connection in low cost. In order to realize the swaging process, however, it is required that some concavo-convex trenches are formed at the inner surfaces of each of the hollow connectors.

Conventionally, as an alloy for a connector would be employed an Al—Zn—Mg series alloy typified by JIS A7N01 or A7003 and an Al—Mn series alloy typified by JIS A3004. In the case that the connectors with the concavo-convex trenches at the respective inner surfaces thereof for the swaging process are made of such an alloy by means of extrusion process, since the deformation resistance in extrusion is larger, the dimensional accuracy for the trenches to be formed is deteriorated so that the trenches must be mechanically processed again after the extrusion process. In this point of view, recently, die casting process is being mainly used for producing the connectors. In the use of the die casting process, however, a secondary processing is required. Therefore, the conventional extrusion process and die casting process require much cost for the production of the connectors.

On the other hand, as a material for pipes to be connected would be employed an Al—Mg—Si series alloy typified by JIS A6063 and an Al—Mn series alloy typified by JIS A3004. With the requirement of longer lifetime for automobile parts, recently, the enhancement of corrosion resistance for the pipes is also required so that the method utilizing the connector material as a sacrificial anode material is employed so as to satisfy the above-described requirement.

Reference 1 teaches, as the connector alloy with sacrificial anode property, an aluminum alloy consisting of Zn: 2 to 10 mass %, Si: 2 to 7 mass %, Fe: 0.5 to 1.5 mass % and/or Mn: 0.1 to 1.5 mass % and the balance of Al plus unavoidable impurities, for example.

The alloy taught in Reference 1, however, is a die casting alloy and thus contains a large amount of Si so as to enhance the fluidity thereof, resulting in being inappropriate in the use as an extrusion alloy because the extrusion formation becomes difficult due to the age hardening in hot extrusion. Moreover, if Si is added to the aluminum alloy, the electric potential of the connector made of the aluminum alloy containing Si becomes a noble potential. In the use of the aluminum alloy for making the connector, since the pipe to be connected with the connector may be corroded, a large amount of Zn must be added to the aluminum alloy so as to lower the electric potential of the aluminum alloy. However, a new problem of deteriorating the corrosion resistance of the aluminum alloy, that is, the connector made of the aluminum alloy is caused. Furthermore, the die casting alloy containing the large amount of Zn is required to be thermally diffused so as to diffuse the large amount of Zn uniformly, which may cause the increase in cost.

References 2 and 3 propose that 0.2 to 1.0 mass % of Zn is added to an Al—Mg—Si alloy. Since the object of the Zn addition is to decrease the difference between the intragranular electric potential and the grain boundary electric potential in the Al—Mg—Si alloy so as to suppress the grain boundary corrosion, if the Al—Mg—Si alloy is employed as the connector material, the sacrificial anode property required for the connector material is disadvantageously insufficient because the difference in electric potential between the connector and the pipe cannot be increased sufficiently due to the small amount of Zn.

In this point of view, in order to realize the connection between the (hollow) connector and the pipe through the swaging process, an aluminum alloy for a connector which has the sacrificial anode property for the pipe and can be extruded in a complicated form so as to have the concavo-convex trenches at the inner surface of the hollow connector is desired.

[Reference 1] JP-A 2007-92113 (KOKAI)
[Reference 2] JP-A 2002-69559 (KOKAI)
[Reference 3] JP-A 10-130765 (KOKAI)

BRIEF SUMMARY OF THE INVENTION

It is an object of the present invention to provide, in order to realize the connection between a connector and a pipe through swaging process, an aluminum alloy for the connector which can be extruded in a complicated form so as to have concavo-convex trenches at the inner surface of the connector and has sacrificial anode property for the pipe, and thus excellent in extrusion property and sacrificial anode property.

In order to achieve the object of the present invention, an aspect of the present invention relates to an aluminum alloy extrusion material (first aluminum alloy) for a connector which is excellent in extrusion property and sacrificial anode property, consisting of 0.2 to 0.8% (hereinafter, "%" means "mass %") of Si, 0.45 to 0.9% of Mg, 1.0 to 3.5% of Zn, 0.001 to 0.2% of Ti and the balance of Al plus unavoidable impurities.

Another aspect of the present invention relates to an aluminum alloy extrusion material (second aluminum alloy) for a connector which is excellent in extrusion property and sacrificial anode property, consisting of 0.2 to 0.8% (hereinafter, "%" means "mass %") of Si, 0.45 to 0.9% of Mg, 1.5 to 2.5% of Zn, 0.001 to 0.2% of Ti and the balance of Al plus unavoidable impurities.

The inventors had intensely and variously studied for the aluminum alloy for a connector. As a result, the inventors found out the following matter. As the first and second aluminum alloy extrusion materials for a connector, by containing Si, Mg, Zn, Ti as the aluminum alloy components into the aluminum alloy and controlling the content of Zn appropriately, the intended aluminum alloy where the extrusion property cannot be deteriorated and which can have the sacrificial anode property for the pipe can be provided. Therefore, if the connector is made of the aluminum alloy, the connector can be easily formed through extrusion molding so as not to corrode the pipe to be connected and so as to have the concavo-convex trenches at the inner surface of the connector.

Here, Reference 1 (JP-A 2007-92113 (KOKAI)) teaches an aluminum alloy with a composition similar to the composition of the aluminum alloy of the present invention. However, since the intended connector is molded by means of die casting in Reference 1, the contents of Si and Zn are set in a large amount. Particularly, the content of Si in Reference 1 is set larger than the content of Si of the aluminum alloy of the present invention. In the comparison with the second aluminum alloy for a connector, moreover, the content of Zn is set larger than the content of Zn of the second aluminum alloy of the present invention. Furthermore, Reference 1 does not require Ti as an essential component.

Therefore, the aluminum alloy in Reference 1 is different from the aluminum alloy in the present invention.

Reference 2 (JP-A 2002-69559 (KOKAI)) teaches an aluminum alloy with a composition similar to the composition of the aluminum alloy of the present invention. Reference 2 also teaches an intended extrusion material is made of the aluminum alloy by means of extrusion molding. Reference 2 does not, however, teach and suggest the use of the aluminum alloy extrusion material as a connector at all. Therefore, Reference 2 does not teach that the aluminum alloy has the sacrificial anode property.

In Reference 2, moreover, the Zn component contained in the aluminum alloy functions as decreasing the difference between the intragranular electric potential and the grain boundary electric potential in the aluminum alloy. In comparison of the aluminum alloy of the present invention with the aluminum alloy of Reference 2, although the critical content (1.0 mass %) of the Zn component of the first aluminum alloy of the present invention is superimposed on the critical content of the Zn component of the aluminum alloy of Reference 2, the content of the Zn component of the aluminum alloy of the Reference 2 is set smaller than the content of Zn component of the aluminum alloy of the present invention as a whole. Therefore, the aluminum alloy in Reference 2 is different from the aluminum alloy for a connector in the present invention.

Reference 3 (JP-A 10-130765 (KOKAI)) teaches an aluminum alloy with a composition similar to the composition of the aluminum alloy of the present invention. Reference 3 also teaches an intended rolled material is made of the aluminum alloy by means of rolling, but does not teach an intended extrusion material is made of the aluminum alloy by means of extrusion molding. Moreover, Reference 3 does not teach and suggest the use of the aluminum alloy extrusion material as a connector at all. Therefore, Reference 3 does not teach that the aluminum alloy has the sacrificial anode property.

In Reference 3, moreover, the Zn component contained in the aluminum alloy mainly functions as decreasing the difference between the intragranular electric potential and the grain boundary electric potential in the aluminum alloy. In comparison of the aluminum alloy of the present invention with the aluminum alloy of Reference 3, although the critical content (1.0 mass %) of the Zn component of the first aluminum alloy of the present invention is superimposed on the critical content of the Zn component of the aluminum alloy of Reference 3, the content of the Zn component of the aluminum alloy of the Reference 3 is set smaller than the content of Zn component of the aluminum alloy of the present invention as a whole. Therefore, the aluminum alloy in Reference 3 is different from the aluminum alloy for a connector in the present invention.

In an embodiment of the present invention, the aluminum alloy extrusion material for a connector can be rendered hollow.

In another embodiment of the present invention, the electric potential of the aluminum alloy extrusion material can be set lower than the electric potential of the pipe member to be swaged by 100 mV or more so as to exhibit the sacrificial anode effect sufficiently.

Effect of the Invention

As described above, according to the present invention can be provided, in order to realize the connection between a connector and a pipe through swaging process, an aluminum alloy for the connector which can be extruded in a complicated form so as to have concavo-convex trenches at the inner surface of the connector and has sacrificial anode property for the pipe, and thus excellent in extrusion property and sacrificial anode property.

BRIEF DESCRIPTION OF THE DRAWINGS

FIG. 1 is a structural view showing an embodiment of a connector made of an aluminum alloy for a connector according to the present invention.

BEST MODE FOR IMPLEMENTING THE INVENTION

Hereinafter, details, other features and advantages of the present invention will be described with reference to the drawings.

(Aluminum Alloy Extrusion Material for a Connector)

First of all, the reasons in addition and the contents of the components of the aluminum alloy extrusion material of the present invention will be described.

<Si (Silicon)>

Si reacts with Mg to form a $Mg_2Si$ compound in the aluminum alloy to enhance the strength of the aluminum alloy in artificial aging treatment after hot molding, that is, extrusion molding and forms, with Mn and Fe, an aging precipitation made of a minute Al—Mn—Si series or Al—Fe—Mn—Si series intermetallic compound. The content of Si is set within a range of 0.2 to 0.8% (hereinafter, "%" means "mass %"). If the content of Si is set less than 0.2%, the above-descried function/effect cannot be exhibited sufficiently. If the content of Si is set larger than 0.8%, the molding property and extrusion property at high temperature may be deteriorated due to excess aging effect.

<Mg (Magnesium)>

As described above, Mg reacts with Si to form the $Mg_2Si$ compound to enhance the strength of the aluminum alloy in the artificial aging treatment after extrusion molding and solid-solves in the matrix of the aluminum alloy to enhance the strength of the aluminum alloy through solid-solution strengthening. The content of Mg is set within a range of 0.45 to 0.9%. If the content of Mg is set less than 0.45%, the above-described function/effect cannot be exhibited sufficiently. If the content of Mg is set more than 0.9%, the molding property and extrusion property at high temperature may be deteriorated due to excess aging effect.

<Zn (Zinc)>

Zn plays very important role in the aluminum alloy extrusion material for a connector of the present invention so as to render a base potential the electric potential of the aluminum alloy extrusion material for the pipe member to be connected. The content of Zn is set within a range of 1.0 to 3.5%. If the content of Zn is set less than 1.0%, the electric potential of the aluminum alloy extrusion material for a connector cannot be rendered the base potential sufficiently so as not to realize the sacrificial anode property sufficiently. On the other hand, if the content of Zn is set larger than 3.5%, the function/effect rendering the electric potential of the aluminum alloy the base potential is saturated so as not to enhance the sacrificial anode property much more while the extrusion property of the aluminum alloy is deteriorated.

In view of extrusion property and the sacrificial anode property, the content of Zn is preferably set within a range of 1.5 to 2.5%.

Moreover, if the content of Zn is set within the above-described range, the electric potential of the aluminum alloy extrusion material for a connector can be lower than that of the pipe member made of such a composition material as an Al—Mg—Si series alloy (e.g., JIS 6063 alloy) or an Al—Mn series alloy (e.g., JIS 3003 alloy or JIS 3004 alloy) by 100 mV or more, preferably 150 mV or more.

<Ti (Titanium)>

Ti functions as refining the ingot structure of the aluminum alloy and as enhancing the corrosion resistance. The content of Ti is set within a range of 0.001 to 0.2%. If the content of Ti is set less than 0.001%, the above-described function/effect cannot be exhibited sufficiently. If the content of Ti is set more than 0.2%, Ti is likely to form a giant intermetallic compound so as to deteriorate the processing property. Preferably, the content of Ti is set within a range of 0.01 to 0.05%.

<Unavoidable Impurities>

The unavoidable impurities are contaminated from various paths such as a bare metal, additive element alloys and the like. Particularly, Fe is an element which is most contained in the corresponding aluminum bare metal. If the content of Fe is set more than 0.35%, an Al—Fe—Si series crystallization product is formed in casting to deteriorate the processing property. Therefore, the content of Fe is set not more than 0.35%. The content of each of other unavoidable impurities is set not more than 0.05% and the total contents of other unavoidable impurities are set not more than 0.15% so that the aluminum alloy cannot be subject to other unavoidable impurities.

(Property of Aluminum Alloy Extrusion Material for a Connector)

If the aluminum alloy has the above-described composition, the aluminum alloy can be extruded in various forms. In the case that the aluminum alloy is used as a swaging connector material for the pipe member, particularly, if the aluminum alloy is directly extruded in a complicated, hollow form, the processing cost can be reduced because the grinding process is not required after the extrusion process. In this case, the concavo-convex or concave-convex trenches are preferably formed at the inner surface of the hollow aluminum alloy (hollow connector).

If the difference in electric potential between the aluminum alloy (connector) and the pipe member is smaller than 100 mV, the sacrificial anode property of the aluminum alloy extrusion material is not sufficient so as not to satisfy the predetermined lifetime of the pipe member. Therefore, the electric potential of the aluminum alloy extrusion material for a connector is lowered than the electric potential of the pipe material preferably by 100 mV or more, more preferably by 150 mV or more.

The above-described requirement can be satisfied inherently if the aluminum alloy extrusion material is defined as the above-described composition and the pipe material is defined as the above-described composition.

(Swaging for Aluminum Alloy Extrusion Material for a Connector)

First of all, the aluminum alloy extrusion material is produced by means of normal technique.

(Solution, Casting, Homogenization Heat Treatment)

In the solution and casting process, the corresponding aluminum alloy melt of which the composition is adjusted to the above-described range in a state of solution is casted by means of a normal melt-casting method appropriately selected from a continuous casting rolling method, a semi-continuous casting method (DC casting method) and the like. Then, the homogenization heat treatment is carried out for the thus casted Al alloy ingot. The temperature of the homogenization heat treatment is set to a temperature of not less than 500° C. and less than the melting point of the Al alloy ingot in accordance with the normal homogenization heat treatment.

(Solution Treatment and Quenching Treatment)

In the present invention, solution treatment and quenching treatment may be carried out as occasion demands. Coarse $Mg_2Si$ intermetallic compound can be solid-solved sufficiently by the solution treatment and the quenching treatment. If the coarse $Mg_2Si$ is not solid-solved sufficiently after the solution treatment, the coarse $Mg_2Si$ causes the deterioration of the strength of the Al alloy ingot after the artificial aging treatment. In order to exhibit the sufficient function/effect of the solution treatment, the solution treatment is preferably carried out within a temperature range of 500 to 560° C.

In the quenching treatment after the solution treatment, if the cooling rate is low, Si, $Mg_2Si$ and the like are likely to be precipitated at the grain boundaries of the Al alloy ingot, which is likely to form the starting point of crack at molding and thus deteriorate the molding property. To ensure the cooling rate, the quenching treatment is preferably conducted by selecting air cooling using a fan or water cooling using a mist, a spray, an immersion so that the cooling rate is set to a rapid cooling rate of 10° C./sec or more.

<Extrusion Processing>

After the Al alloy ingot is molded as described above, extrusion processing is conducted for the Al alloy ingot to form an intended extrusion material with a desired shape and dimension (in this embodiment, the extrusion material is a connector). The extrusion processing can be conducted using a porthole extrusion method, a mandrel method or the like.

<Swaging Processing>

FIG. 1 is a structural view showing an embodiment of a connector made of the aluminum alloy extrusion material of the present invention.

The connector 10 in this embodiment is shaped in a form of large keyhole-shaped tomb mound as shown in FIG. 1 so that a first through-hole 13 for inserting a bolt therein as a fixing means is formed at the square portion 11 and a second through-hole 14 for inserting a pipe member therein is formed at the circle portion 12. Then, two pairs of concavo-convex portions 15 are formed at the side surface of the second through hole 14.

Therefore, if the connector 10 is swaged after the pipe member is inserted in the second through-hole 14 of the connector 10 in FIG. 1, the pipe member is fixed at the connector 10 via the concavo-convex portions 15 so as to be connected with the connector 10.

EXAMPLE

Hereinafter, the present invention will be described in detail based on examples. However, it is to be understood that the present invention is not limited to the examples because the examples are only used for describing the effect of the present invention.

Various billets with the respective compositions listed in Table 1 were produced by means of a semi-continuous casting method, and then, thermally treated in homogenization at 565° C. for 4 hours. The resultant billets were heated at 500° C., and extruded at an extrusion rate of 5 m/min by means of a porthole extrusion method to mold the connector 10 as shown in FIG. 1. The width "W" of the circle portion 12 of the connector 10 was set to 30 mm and the length "L" of the connector 10 was set to 50 mm. Then, the diameter "r" of the first through-hole 13 was set to 10 mm and the diameter "R" of the second through-hole 14 was set to 16 mm.

1. Extrusion Property

As the evaluation of extrusion property, the connector with no crack at the surface and interior surface thereof is designated by "Excellent", the connector with some minute cracks only at the concavo-convex portion of the interior surface thereof is designated by "Good" and the connector with some cracks at the surface and interior surface thereof is designated by "Poor".

2. Tensile Test

Tensile test was carried out in accordance with JIS Z2201 by cutting JIS No. 4 tensile test pieces out of the connectors after an artificial aging treatment was performed for the connectors under the condition of 180° C. for 6 hours.

3. Corrosion Resistance Test

As the corrosion resistance test, the connectors made of the corresponding alloys with the respective compositions listed in FIG. 1 by means of extrusion were swaged with the pipe member made of a JIS 6063 alloy by means of extrusion to form the respective test pieces. Then, salt spray test was carried out for the test pieces so that after exposure of 1000 hours, the maximum depth of pitting corrosion was measured for the test pieces and the leak test was carried out for the pipe member making the test pieces.

4. Spontaneous Electrode Potential Measurement of Connector

Spontaneous electrode potential was measured as follows. The connectors as test pieces were pre-treated by immersing the connectors in a 5% NaOH solution kept at 60° C. for 30 seconds and then, immersing the connectors in a 30% HNO₃ solution. Then, the connectors were immersed in a 5% NaCl-15 mL/L acetic acid solution to measure the respective spontaneous electrode potentials of the connectors after 30 minutes elapsed. Moreover, a 6063-T5 material was prepared as the pipe member and the spontaneous potential of the member was measured in the same manner as the connectors so that the differences in electric potential between the connectors (i.e., alloys listed in Table 1) and the member were measured. The measurement results were listed in Table 2.

TABLE 1

(Mass %)

| | Alloy No | Si | Fe | Mg | Zn | Ti | Al | Remarks |
|---|---|---|---|---|---|---|---|---|
| Examples | A | 0.45 | 0.20 | 0.55 | 1.0 | 0.01 | balance | Lower limited value of Zn in claims |
| | B | 0.45 | 0.18 | 0.55 | 2.5 | 0.01 | balance | Preferable upper limited value of Zn in claims |
| | C | 0.45 | 0.23 | 0.55 | 3.5 | 0.01 | balance | Upper limited value of Zn in claims |
| | D | 0.45 | 0.16 | 0.55 | 1.5 | 0.01 | balance | Preferable lower limited value of Zn in claims |
| | E | 0.20 | 0.18 | 0.55 | 1.6 | 0.01 | balance | Lower limited value of Si in claims |
| | F | 0.80 | 0.22 | 0.55 | 1.6 | 0.01 | balance | Upper limited value of Si in claims |
| | G | 0.45 | 0.23 | 0.45 | 1.6 | 0.01 | balance | Lower limited value of Mg in claims |
| | H | 0.45 | 0.16 | 0.90 | 1.6 | 0.01 | balance | Upper limited value of Mg in claims |
| | I | 0.45 | 0.18 | 0.55 | 1.6 | 0.001 | balance | Lower limited value of Ti in claims |
| | J | 0.45 | 0.13 | 0.55 | 1.6 | 0.2 | balance | Upper limited value of Ti in claims |
| Comparative Examples | K | 0.19 | 0.22 | 0.55 | 1.6 | 0.01 | balance | Less than lower limited value of Si in claims |
| | L | 0.82 | 0.20 | 0.55 | 1.6 | 0.01 | balance | More than upper limited value of Si in claims |
| | M | 0.45 | 0.21 | 0.91 | 1.6 | 0.01 | balance | More than upper limited value of Mg in claims |
| | N | 0.45 | 0.14 | 0.42 | 1.6 | 0.01 | balance | Less than lower limited value of Mg in claims |
| | O | 0.45 | 0.23 | 0.55 | 0.9 | 0.01 | balance | Less than lower limited value of Zn in claims |
| | P | 0.45 | 0.18 | 0.55 | 3.6 | 0.01 | balance | More than upper limited value of Zn in claims |

TABLE 2

| | Alloy No | Tensile strength (MPa) | Yield strength (MPa) | Elongation percentage (%) | Voltage (mV) | Extrusion | Depth of pitting corrosion in connector | Occurrence of leak of pipe member |
|---|---|---|---|---|---|---|---|---|
| Examples | A | 268 | 250 | 13.0 | 108 | Excellent | 29 | No |
| | B | 276 | 261 | 12.6 | 250 | Excellent | 83 | No |
| | C | 288 | 272 | 12.2 | 334 | Good | 95 | No |
| | D | 266 | 244 | 13.6 | 153 | Excellent | 48 | No |
| | E | 210 | 195 | 13.5 | 161 | Excellent | 60 | No |
| | F | 277 | 268 | 13.4 | 166 | Excellent | 63 | No |
| | G | 225 | 206 | 13.6 | 163 | Excellent | 58 | No |
| | H | 278 | 255 | 12.4 | 170 | Excellent | 65 | No |
| | I | 270 | 253 | 12.6 | 169 | Excellent | 59 | No |
| | J | 266 | 248 | 12.8 | 164 | Excellent | 52 | No |

TABLE 2-continued

| Alloy No | | Tensile strength (MPa) | Yield strength (MPa) | Elongation percentage (%) | Voltage (mV) | Extrusion | Depth of pitting corrosion in connector | Occurrence of leak of pipe member |
|---|---|---|---|---|---|---|---|---|
| Comparative Examples | K | 183 | 160 | 14.2 | 158 | Excellent | 70 | No |
| | L | 280 | 272 | 12.4 | 155 | Poor | 74 | No |
| | M | 273 | 259 | 13.6 | 167 | Poor | 70 | No |
| | N | 170 | 156 | 14.8 | 166 | Excellent | 64 | No |
| | O | 255 | 234 | 14.2 | 85 | Excellent | 15 | Yes |
| | P | 298 | 288 | 12.4 | 356 | Poor | 121 | No |

The measurement results listed in Table 2 will be described. The alloys denoted by No. A to No. J are encompassed by claim 1 so as to be excellent in mechanical property, sacrificial anode property, extrusion property and corrosion resistance. Particularly, since the alloys denoted by No. B and No. D to J are encompassed by the corresponding preferable ranges of the corresponding metallic elements, respectively, the differences in electric potential of the alloys are 150 mV or more and the extrusion properties of the alloys are excellent. The alloys denoted by No. K and No. N are not encompassed by claim 1 because the contents of Si and Mg are less than the respective lower limited values defined in claim 1. Therefore, the alloys denoted by No. K and No. N are decreased in strength so as not to satisfy the strength required for the connector. The alloys denoted by No. L and No. M are not encompassed by claim 1 because the contents of the Si and Mg are more than the respective upper limited values defined in claim 1. Therefore, surface defects are generated at the extrusion and thus the properties of the connectors are not excellent. The alloy denoted by No. O is not encompassed by claim 1 because the content of Zn is less than the lower limited value defined in claim 1 so that the difference in electric potential between the pipe member and the connector is not approached to 100 mV and thus the connector cannot exhibit sufficient sacrificial anode property for the pipe member. Moreover, the alloy denoted by No. P is not also encompassed by claim 1 because the contents of Zn is more than the upper limited value defined in claim 1 and thus the connector is extremely corroded in the corrosion resistance test.

Although the present invention was described in detail with reference to the above examples, this invention is not limited to the above disclosure and every kind of variation and modification may be made without departing from the scope of the present invention.

What is claimed is:

1. An aluminum alloy swaging connector which is excellent in extrusion property and sacrificial anode property, the connector being extruded in a hollow, swaging shape from an aluminum alloy extrusion material consisting of 0.2 to 0.8% (hereinafter, "%" means "mass %") of Si, 0.45 to 0.9% of Mg, 1.0 to 3.5% of Zn, 0.001 to 0.2% of Ti and the balance of Al plus unavoidable impurities, wherein an electric potential of said aluminum alloy extrusion swaging connecter is lower than an electric potential of a pipe member made of an Al—Mg—Si series alloy or an Al—Mn series alloy by 100 mV or more, and wherein said aluminum alloy extrusion swaging connecter is swaged to the pipe member made of an Al—Mg—Si series alloy or an Al—Mn series alloy so as to connect the pipe member with the swaging connecter.

2. An aluminum alloy swaging connector which is excellent in extrusion property and sacrificial anode property, the connector being extruded in a hollow, swaging shape from an aluminum alloy extrusion material consisting of 0.2 to 0.8% (hereinafter, "%" means "mass %") of Si, 0.45 to 0.9% of Mg, 1.5 to 2.5% of Zn, 0.001 to 0.2% of Ti and the balance of Al plus unavoidable impurities, wherein an electric potential of said aluminum alloy extrusion swaging connecter is lower than an electric potential of a pipe member made of an Al—Mg—Si series alloy or an Al—Mn series alloy by 100 mV or more, and wherein said aluminum alloy extrusion swaging connecter is swaged to the pipe member made of an Al—Mg—Si series alloy or an Al—Mn series alloy so as to connect the pipe member with the swaging connecter.

3. The aluminum alloy swaging connector of claim 1, wherein the pipe member is made of A6063 alloy in the Al—Mg—Si series alloy, or A3003 alloy or A3004 alloy in the Al—Mn series alloy.

4. The aluminum alloy swaging connector of claim 1, wherein the swaging connector is directly extruded to include concave-convex trenches formed at an inner surface of the hollow, swaging shape.

5. The aluminum alloy swaging connector of claim 2, wherein the pipe member is made of A6063 alloy in the Al—Mg—Si series alloy, or A3003 alloy or A3004 alloy in the Al—Mn series alloy.

6. The aluminum alloy swaging connector of claim 2, wherein the swaging connector is directly extruded to include concave-convex trenches formed at an inner surface of the hollow, swaging shape.

7. A connecting structure of a swaging connecter and a pipe, comprising:
an aluminum alloy swaging connector made of an aluminum alloy extrusion material consisting of 0.2 to 0.8% (hereinafter, "%" means "mass %") of Si, 0.45 to 0.9% of Mg, 1.0 to 3.5% of Zn, 0.001 to 0.2% of Ti and the balance of Al plus unavoidable impurities, the swaging connector being extruded in a hollow, swaging shape from the aluminum alloy extrusion material; and
a pipe member made of an Al—Mg—Si series alloy or an Al—Mn series alloy, the pipe member being connected with the swaging connecter by swaging to the swaging connecter,
wherein an electric potential of said aluminum alloy extrusion swaging connecter is lower than an electric potential of the pipe member by 100 mV or more.

8. The connecting structure of claim 7, wherein the aluminum alloy extrusion material contains 1.5 to 2.5% of Zn.

9. The connecting structure of claim 5, wherein the pipe member is made of A6063 alloy in the Al—Mg—Si series alloy, or A3003 alloy or A3004 alloy in the Al—Mn series alloy.

10. The connecting structure of claim 7, wherein the swaging connecter is directly extruded to include concave-convex trenches formed at an inner surface of the hollow, swaging shape.

* * * * *